United States Patent [19]

Fahrner et al.

[11] Patent Number: 4,969,781
[45] Date of Patent: Nov. 13, 1990

[54] BLIND FASTENER HAND TOOL

[75] Inventors: Alan J. Fahrner, Canton; Thomas S. Betchel, Norton, both of Ohio

[73] Assignee: The B. F. Goodrich Company, Akron, Ohio

[21] Appl. No.: 334,499

[22] Filed: Apr. 7, 1989

[51] Int. Cl.⁵ .............................................. B23B 41/00
[52] U.S. Cl. ................................. 408/79; 408/115 B; 408/97; 408/112
[58] Field of Search ............... 408/72 R, 72 B, 79–82, 408/118, 119, 112, 111, 110, 115 B, 83, 84, 95–98, 241 B, 14

[56] References Cited

U.S. PATENT DOCUMENTS

| | | | |
|---|---|---|---|
| 2,224,480 | 12/1940 | Kartarik | 408/81 |
| 2,294,303 | 8/1942 | Jagow | 408/80 X |
| 2,670,637 | 3/1954 | Whitechester | 408/79 |
| 2,674,906 | 4/1954 | Timpner | 408/97 X |
| 2,792,726 | 5/1957 | Vick | 408/81 |
| 2,830,377 | 4/1958 | Wenz | 408/79 X |
| 3,540,322 | 11/1970 | Swanson | 408/72 |

FOREIGN PATENT DOCUMENTS

| | | | |
|---|---|---|---|
| 736995 | 7/1943 | Fed. Rep. of Germany | 408/112 |
| 125804 | 5/1919 | United Kingdom | 408/110 |

Primary Examiner—Z. R. Bilinsky
Assistant Examiner—R. Schultz
Attorney, Agent, or Firm—Joseph Januszkiewicz

[57] ABSTRACT

A hand tool for the preparation of an off-set bore relative to a countersunk recess in a structural plate member wherein a pilot sleeve with a central bore slidably support an upper hollow sleeve that is spring biased away from the pilot sleeve. A bushing secured to the upper portion of said hollow sleeve also retains a drill bit that extends in to the pilot sleeve while the shank end is connectable to a drill for rotation and axial movement with the hollow sleeve relative to the pilot sleeve to drill a through bore in the plate member whose axis is off-set relative to a tapered countersunk conical recess in the plate member. The lower end of the pilot sleeve has a tapered annular surface or conical recess whose central axis is off-set relative to the axis of the central bore of said pilot sleeve, and a handle is secured to the pilot sleeve to position and hold the hand tool in the countersunk recess of the plate member as it is drilled.

9 Claims, 4 Drawing Sheets

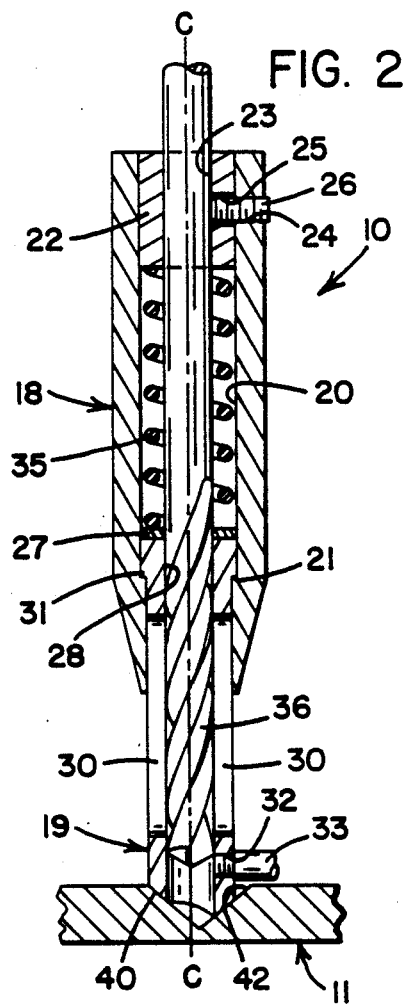
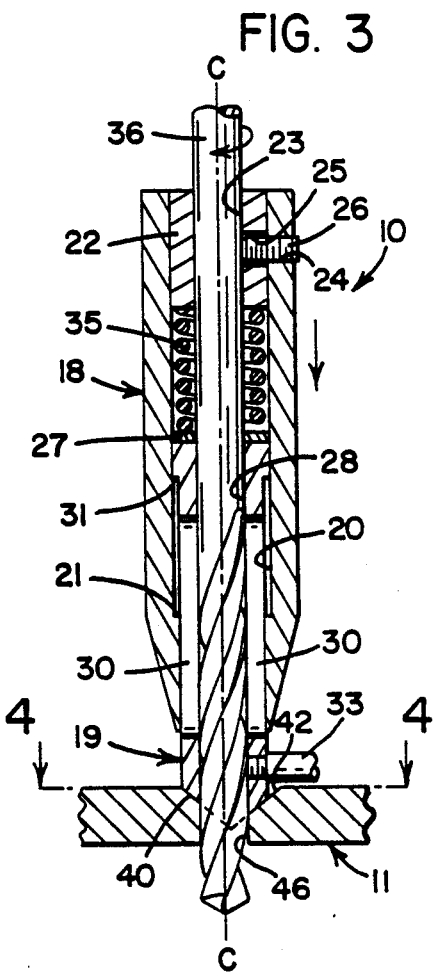
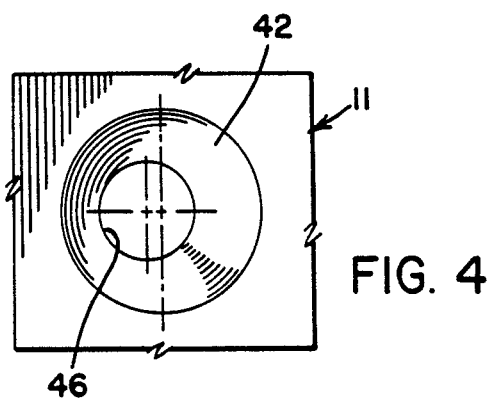

BLIND FASTENER HAND TOOL

BACKGROUND OF THE INVENTION

This invention relates to a hand tool for the preparation of bores for use of blind fasteners in sheet material wherein the bore has an off-set countersunk recess.

In the preparation of sheet material or thin structural plate members for the reception of blind fasteners it has been the general practice to drill a hole completely through the plate member and thence if necessary to countersink the hole to facilitate the securing of a blind fastener thereto. The present invention is directed to a tool that is readily portable and can efficiently prepare sheet material for the reception of a uniquely constructed blind fastener. The fastener has an upper hollow head portion that tapers to a tubular body portion wherein the central axis of the tapered head is off-set from the axis of the central bore of the tubular body portion. To install such fastener it is necessary to first perform a countersinking operation and then drill the bore so that its axis is off-set from the central axis of the countersunk recess. The use of a fastener as described in such a counter-sunk bore combination is that such fastener can be installed quickly and conveniently without concern for any rotation of the fastener due to its off-set head. The present invention is directed to a hand tool for use in preparing the off-set bore with its countersunk recess or upper portion wherein the tool expedites the preparation of the fastening operation where the fastener is subjected to high torques. The tool of the instant invention provides a more accurate means for expediting the preparation of such fastening operations, and a handle connected to said pilot sleeve to steady said hand tool for use thereof.

SUMMARY OF THE INVENTION

A hand tool for use in the preparation of an off-set bore relative to a countersunk tapered recess in a plate member wherein the hand tool has a lower stationary sleeve slidably retained by a hollow upper sleeve that is axially movable relative thereto with a spring biasing such hollow sleeve away from such lower sleeve. The lower sleeve's end portion has an annular taper whose axis is off-set relative to the axis of the central bore that extends through the sleeves. A drill bit is secured to the upper sleeve and extends into the central bore of the lower sleeve for movement therethrough, while the shank projects outwardly from the upper sleeve for connection to a motive means such as a hand held power drill for rotating the drill bit while exerting a downward pressure thereon to drill an off-set bore in the plate member.

BRIEF DESCRIPTION OF THE DRAWINGS

In the accompanying drawings,

FIG. 2 is a side elevational view in cross section of the hand tool with the end portion thereof in engagement with the countersunk recess in the structural plate member;

FIG. 3 is a side elevational view in cross section of the hand tool having a drill bit drilling a hole that is off-set from the central axis of the countersunk recess in the structural plate member;

FIG. 4 is a plan view of the off-set hole relative to the countersunk recess in the structural plate member;

DETAILED DESCRIPTION

Figure 1:
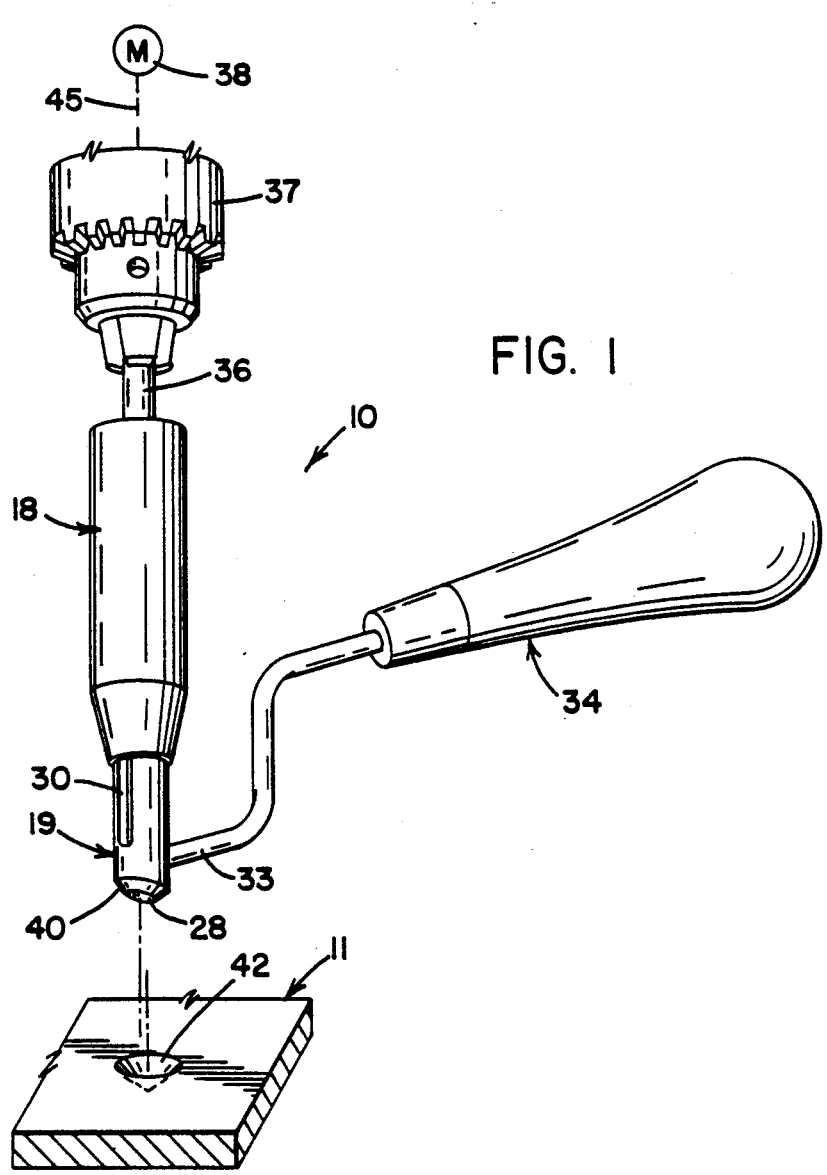
FIG. 1 is a perspective view of the hand tool in alignment for use on a countersunk structural sheet plate member.
Figure 5:
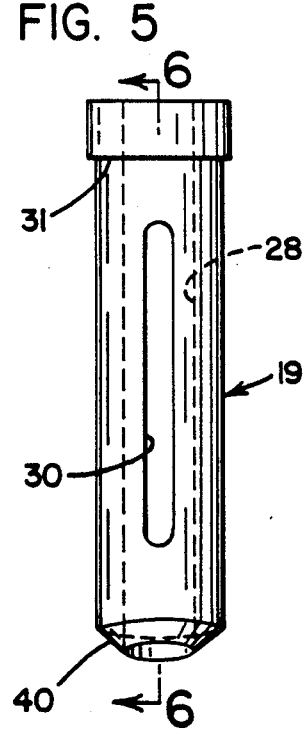
FIG. 5 is a side elevational view of the pilot sleeve.

Referring to the drawings wherein like reference numerals refer to like elements in the several views, there is shown in FIG. 1 a hand tool 10 and a portion of a structural plate member 11 (which is a relatively thin sheet of material). The blind fastener 12 which is shown in FIG. 8E, 8F and 8G is on an enlarged scale to more accurately depict the various parts thereof A hand tool 10 is used to prepare the plate member 11 to receive the blind fastener 12.

The blind fastener 12 has a circular head 13 and a hollow tubular body 14 depending therefrom. The head 13 is flat on top and tapers towards the tubular body 14, which body 14 has a reduced wall thickness adjacent to the head 13 and a lower portion that has a thicker walled portion relative to such thin walled portion. The thin walled portion of the fastener 12 is designated 15 in FIG. 8E, which portion facilitates the upsetting of the blind fastener in a manner to be described. The inside diameter of the bore of the thin walled portion is greater than the diameter of bore of the lower portion which has the thick walled portion. The bore of the thick walled lower portion is threaded to receive an upsetting tool and thereafter the fastening means such as a threaded bolt. Longitudinal slits may be provided in the thin walled portion or the upper body portion 15 of the tubular body 14 to facilitate the upsetting of the tubular body of the blind fastener 12. The central bore 16 of the fastener may extend completely through the head 13 and tubular body 14 or slightly short thereof as seen in FIG. 8E. The central axis of the tapered head 12 is designated A—A in FIG. 8E whereas the vertical axis B—B of the central bore 16 of the fastener 12 is off-set relative to such axis of A—A but parallel thereto.

The hand tool 10 has an upper rotatable sleeve 18 and a lower stationary pilot sleeve 19. The upper sleeve 18 is a longitudinally extending sleeve with a central bore 20 extending therethrough. The very lower portion of bore 20 in sleeve 18 has an annular shoulder 21 that acts as a stop member to be described. A bushing 22 with a bore 23 is press fitted within the uppermost end portion of central bore 20 in sleeve 18. A threaded aperture 24 extends radially into sleeve 18 and through a threaded aperture 25 in bushing 22 which is in alignment therewith to receive a threaded plug 26. A bushing or washer 27 is seated in the lowermost end portion of the central bore 20 of sleeve 18.

The pilot sleeve 19 is a longitudinally extending member having a through bore 28. The sleeve 19 has a pair of diametrically opposed slots 30 that are longitudinally extending along the entire intermediate portion thereof. The uppermost portion of pilot sleeve 19 is cylindrically shaped with an external annular shoulder 31 that is adapted to engage the annular shoulder 21 within upper sleeve 18. The lower tubular portion of pilot sleeve 19 has a radially disposed threaded bore 32 that is adapted to receive the threaded end of a rod 33 of handle 34. As seen in FIG. 1, rod 33 is a general S shaped configuration to provide the operator with convenience of controlling the hand tool 10.

In assembling the hand tool 10, pilot sleeve 19 is slid into the through bore 20 of sleeve 18 such that annular shoulder 31 of pilot sleeve 19 rests on annular shoulder 21 of sleeve 18. Sufficient clearance is provided between the mating parts of pilot sleeve 18 and sleeve 19 to permit rotation therebetween as well as relative axial movement therebetween. Washer 27 is thence placed into bore 20 followed by the placement of a compression coil spring 35 also placed therein. Bushing 22 is thence press-fitted into bore 20 such that threaded aperture 25 is in alignment with threaded aperture 24 to receive threaded plug 26. A drill bit 36 is slid into sleeve 18 such that its forward cutting portion extends into pilot sleeve 19, with its shank end secured to the sleeve 18 via threaded plug 26 frictionally engaging it. The shank of drill bit 36 may be recessed to assure a tight connection to bushing 22 and sleeve 18 as threaded plug 26 extends into threaded apertures 24 and 25. As illustrated in FIG. 1, the shank end of drill bit 36 is received by a chuck 37 which may be the chuck of a hand held drill indicated as a motor 38.

Figure 6:
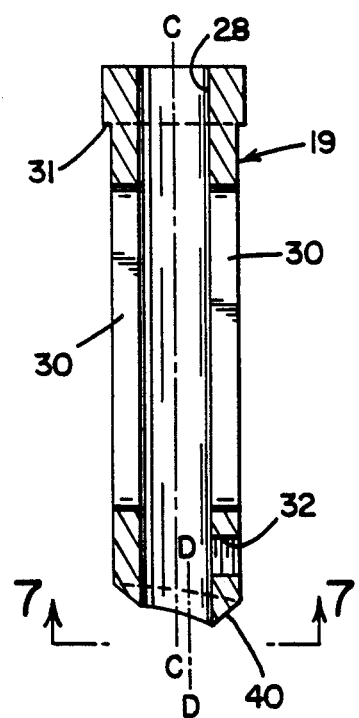
FIG. 6 is a side elevational view in cross section of the pilot sleeve taken on line 6—6 of FIG. 5.
Figure 7:
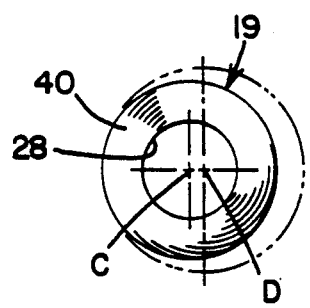
FIG. 7 is bottom view of the pilot sleeve taken on line 6—6 of FIG. 6.

The very lowermost end portion of pilot sleeve 19 has a tapered conical end 40. As seen in FIG. 6, the central axis of the bore 28 of pilot sleeve 19 lies along a line designated C—C whereas the center line of the conical taper is designated D—D in FIG. 6, which center line is off-set relative to the center line C—C of bore 28. The significance of this is that when the conical hand tool is placed into a conical tapered bore, the taper of the pilot end 40 is located with its axis D—D directly coincident with the conical taper of the recess as indicated in FIG. 8C but the center line of the bore of the pilot sleeve 19 and bore 20 of sleeve 18 is off-set from the axis D—D, so that when a hole is drilled by drill bit 36 such hole or bore is off-set relative such axis D—D.

Figure 8A:
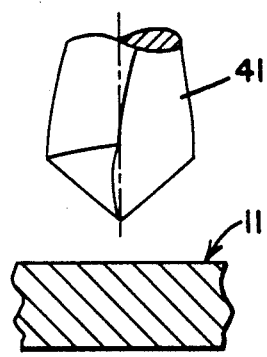
FIG. 8A is a cross sectional view of a portion of a structural plate member with a fragmentary portion of countersinking bit above such plate member.
Figure 8B:
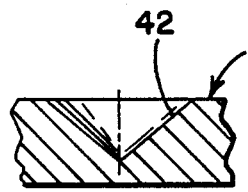
FIG. 8B is a cross sectional view of a portion of such plate member with a countersunk recess therein.
Figure 8C:
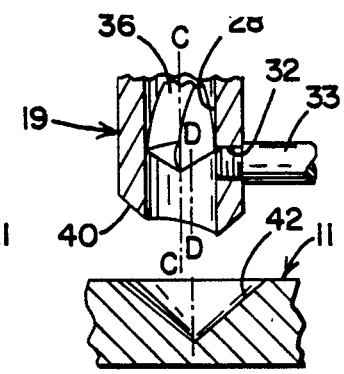
FIG. 8C is a cross sectional view of a portion of a plate member with the lower portion of the hand tool approaching the countersunk recess disclosing the off-set taper of the very bottom portion of the pilot sleeve with a portion of the drill bit shown in full.
Figure 8D:
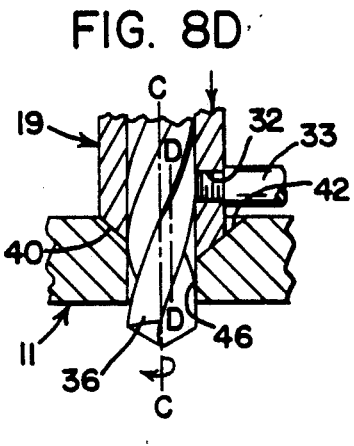
FIG. 8D is a cross sectional view of a portion of a plate member with the lower portion of the hand tool in engagement with the plate member and drill bit completing the bore whose central axis is off-set from the axis of the countersunk recess.
Figure 8E:
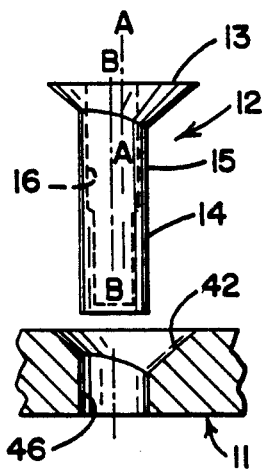
FIG. 8E is a side elevational view of the plate member with tapered or countersunk recess and the off-set bore with a blind fastener positioned for installation into such recess and bore.
Figure 8F:
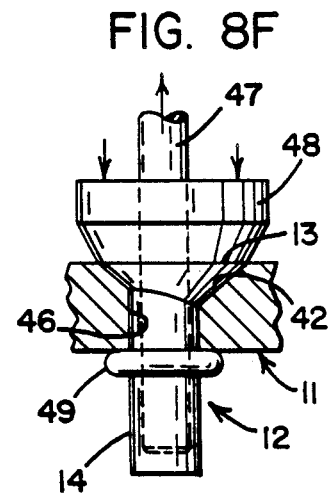
FIG. 8F is a side elevational view of the plate member with its recess and off-set bore receiving the fastener with its tubular body portion upset and with an upsetting tool engaged with such fastener after completion of the upsetting action.
Figure 8G:
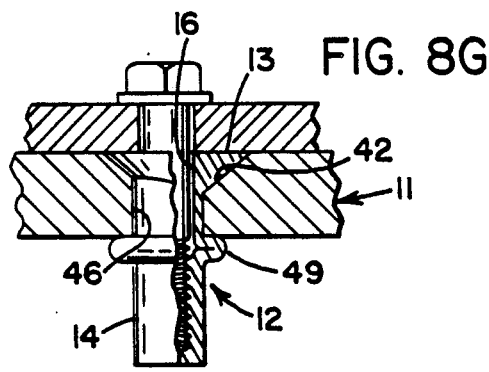
FIG. 8G is a cross sectional view of the plate member with the blind fastener secured thereto and with a second plate member secured to the first mentioned plate member by a conventional bolt.

In the operation of the hand held tool, a countersinking bit 41 is shown in FIG. 8A as positioned above the structural plate member 11 such that it drills a conical tapered or countersunk conical recess 42 into such plate member 11.

The hand held tool 10 is then positioned into the countersunk recess 42 such that the tapered conical end 40 of the pilot sleeve 19 is firmly held and seated therein. As the drill bit 36 with chuck 37 (as from a drill not shown but connected thereto via the dotted line 45 of FIG. 1) is rotated and pressed downwardly toward the plate member 11, sleeve 18 will move downwardly with the rotating drill bit 36, compressing pilot sleeve 19 thereby firmly retaining the hand tool in its given position relative to recess 42. Further downward movement and rotation of the drill bit 36 and sleeve 18 relative to stationary pilot sleeve 19 will allow drill bit 36 to drill a bore 46 whose axis is off-set relative to axis of the countersunk conical recess 42.

After withdrawal of the hand tool 10 from the plate member 11, fastener 12 is positioned into plate member 11 with the top surface of the head 13 even with the top surface of the plate member 11 and such head 13 is fully seated in the bore 46 with the tubular bodY 14 extending therethrough. A draw rod 47 is inserted into the central bore 16 of the tubular body 14 and threaded into the threaded lower bore portion of fastener 12. With the fastener 12 fully seated in the bore 46, a non-rotatable anvil 48 bears against the head 13 as upward tension and movement is applied on the draw rod 47 until the thin walled portion 15 of the tubular body is caused to buckle as at 49 forming an annular bulge as depicted by FIG. 8F to firmly secure the fastener 12 onto plate member 11.

Various modifications are contemplated and may obviously be resorted to by those skilled in the art without departing from the described invention, as hereinafter defined by the appended claims, as only a preferred embodiment thereof has been disclosed.

We claim:

1. A hand tool for the preparation of an off-set bore relative to a countersunk recess in a structural plate member comprising a pilot sleeve (19) with a central bore, said central bore having a central axis, a hollow sleeve (18) with a longitudinally extending bore 20 whose axis is coincident with said central axis of said central bore, the upper portion of said pilot sleeve slidingly received by the lower portion of said longitudinally extending bore of said hollow sleeve for predetermined relative movement therebetween, a bushing (22) secured to the upper portion of said hollow sleeve (18), a drill bit located centrally in said hollow sleeve and extending into said central bore of said pilot sleeve, means (26) interconnecting said drill bit to said hollow sleeve to provide rotation and axial movement therewith upon rotation of said drill bit, the shank of said drill bit extending out of said hollow sleeve for engagement by a rotative power means that rotates said drill bit and operative to axially move a portion of said drill bit through said pilot sleeve, a compression (35) spring located in said longitudinally extending bore of said hollow sleeve between said bushing and said upper portion of said pilot sleeve to bias said pilot sleeve and said bushing away from each other, the lower end portion of said pilot sleeve having a conical end that defines an axis that is off-set relative to the said central axis of said central bore of said pilot sleeve, and a handle secured to said pilot sleeve to position and hold said pilot sleeve in a counterbore of a plate member to be drilled by said drill bit.

2. A hand tool as set forth in claim 1 wherein said hollow sleeve has stop means to limit said predetermined relative movement of said pilot sleeve relative to said hollow sleeve.

3. A hand tool as set forth in claim 2 wherein said pilot sleeve has a pair of slots to deflect shavings from a drilling operation outwardly therefrom.

4. A hand tool as set forth in claim 3 wherein the uppermost portion of said pilot sleeve supports a washer in said hollow sleeve that frictionally engages said compression spring for rotation therewith.

5. A hand tool as set forth in claim 4 wherein said central bore of said pilot sleeve has a clearance between its internal bore and the external diameter of said drill bit to provide a guiding of said drill bit as it moves through said central bore of said pilot sleeve.

6. A hand tool as set forth in claim 5 wherein motive drive means are connected to said shank of said drill bit to rotate said drill bit and said hollow sleeve in unison relative to said pilot sleeve.

7. A hand tool for the drilling of a hole whose axis is off-set relative to an axis of a countersunk conical recess in a structural plate member, said hand tool having a pilot sleeve with a central bore, said central bore having a first axis, the upper portion of said pilot sleeve slidingly received by a hollow sleeve for predetermined relative movement therebetween, said hollow sleeve having a central bore whose axis is coincident with said first axis, a drill bit located centrally in said central bore of said hollow sleeve and extending into said central bore of said pilot sleeve, means interconnecting said drill bit to said hollow sleeve to provide rotation therewith upon rotation of said drill bit and axially fixing said drill bit with respect to said hollow sleeve, the shank of said drill bit extending axially out of said hollow sleeve for engagement by a rotative power means that rotates said drill bit and said hollow sleeve, a compression spring located in said central bore of said hollow sleeve and operative to bias said pilot sleeve and said hollow sleeve away from each other, the lower end portion of said pilot sleeve having a conical end whose central axis is off-set relative to said first axis of said central bore, and a handle secured to said pilot sleeve to position and hold said pilot sleeve in a conical counterbore of a plate member to be drilled by said drill bit to facilitate the drilling of a hole whose axis is off-set from said central axis of said conical end.

8. A hand tool as set forth in claim 7 wherein said hollow sleeve has stop means to limit said predetermined relative movement of said pilot sleeve relative to said hollow sleeve.

9. A hand tool as set forth in claim 8 wherein said drill bit has a forwardly disposed point that is located within one of said sleeves.

* * * * *